United States Patent
Xi et al.

(10) Patent No.: US 9,774,255 B2
(45) Date of Patent: Sep. 26, 2017

(54) SYNCHRONOUS BUCK DC-DC CONVERTER AND METHOD THEREOF

(71) Applicant: M3 Technology Inc., Taipei (TW)

(72) Inventors: Xiaoyu Xi, Taipei (TW); David Da Meng, Taipei (TW)

(73) Assignee: M3 TECHNOLOGY INC., Taipei (TW)

( * ) Notice: Subject to any disclaimer, the term of this patent is extended or adjusted under 35 U.S.C. 154(b) by 0 days.

(21) Appl. No.: 15/045,751

(22) Filed: Feb. 17, 2016

(65) Prior Publication Data

US 2017/0163150 A1    Jun. 8, 2017

(30) Foreign Application Priority Data

Dec. 7, 2015    (TW) .............................. 104141004 A

(51) Int. Cl.
    *H02M 3/157*    (2006.01)
    *H02M 3/158*    (2006.01)
    *H02M 3/156*    (2006.01)

(52) U.S. Cl.
    CPC ........... *H02M 3/157* (2013.01); *H02M 3/158* (2013.01); *H02M 3/156* (2013.01)

(58) Field of Classification Search
    CPC ...... H02M 3/155; H02M 3/156; H02M 3/157; H02M 3/158; H02M 3/1588; H02M 3/1582; H02M 2001/0003; H02M 2001/0006; H02M 2001/0009
    See application file for complete search history.

(56) References Cited

U.S. PATENT DOCUMENTS

| | | | | |
|---|---|---|---|---|
| 8,242,764 | B2* | 8/2012 | Shimizu | H02M 3/1588 323/284 |
| 2008/0088292 | A1* | 4/2008 | Stoichita | H02M 3/156 323/285 |
| 2010/0134084 | A1* | 6/2010 | Miyamae | H02M 3/157 323/283 |
| 2012/0299562 | A1* | 11/2012 | Noda | H02M 3/1588 323/271 |
| 2013/0088208 | A1* | 4/2013 | Noda | H02M 3/158 323/271 |
| 2016/0172999 | A1* | 6/2016 | Fogg | H02M 1/32 363/53 |

* cited by examiner

*Primary Examiner* — Emily P Pham
*Assistant Examiner* — Shahzeb K Ahmad
(74) *Attorney, Agent, or Firm* — McClure, Qualey & Rodack, LLP

(57) ABSTRACT

A synchronous buck direct current to direct current (DC-DC) converter includes a signal output terminal, an output stage circuit, a first comparator, a latch, a control logic circuit, a driver circuit and an on-time control circuit. The output stage circuit provides an output voltage to the signal output terminal according to an input voltage. The first comparator receives a reference voltage and a feedback signal related to the output voltage and outputs a control signal. The latch receives the control signal and a timing signal and outputs an on-enable signal. The control logic circuit receives the on-enable signal and outputs an on-control signal. The driver circuit controls charge/discharge time of the output stage circuit according to the on-control signal. The on-time control circuit receives the on-control signal and the input voltage and outputs the timing signal related to a duty cycle of the output stage circuit.

7 Claims, 6 Drawing Sheets

US 9,774,255 B2

SYNCHRONOUS BUCK DC-DC CONVERTER AND METHOD THEREOF

CROSS-REFERENCES TO RELATED APPLICATIONS

This non-provisional application claims priority under 35 U.S.C. §119(a) on Patent Application No. 104141004 filed in Taiwan, R.O.C. on 2015 Dec. 7, the entire contents of which are hereby incorporated by reference.

BACKGROUND

Technical Field

The instant disclosure relates to a direct current to direct current (DC-DC) converter, and in particular relates to a synchronous buck DC-DC converter and method thereof.

Related Art

For power management applications, synchronous buck direct current to direct current (DC-DC) converters have various control modes. When using a constant on-time control mode, DC-DC converters can operate directly with output voltage ripples, requiring no special pulse width modulation (PWM) signal generator circuit or loop compensation network. This control scheme can greatly simplify the topologies of power supply systems which adapt DC-DC converters and improve transient responses of power supply systems with a wide range of load and output capacitance, as well as enhance reliability of power supply systems.

In a typical topology of a conventional constant on-time control mode synchronous buck DC-DC converter, the output voltage, usually used as a threshold voltage, is compared with the voltage across the capacitor in a timer to generate a timing signal. And the timing signal and a control voltage signal are used to control the "ON" time of the power transistor, thereby to regulate the output voltage.

For existing constant on-time control mode schemes, on-resistance of a power transistor may result in that a switching period of the power transistor varies with load current, which affects the operation and performance of DC-DC converters and also limits the applications of DC-DC converters.

SUMMARY

A synchronous buck direct current to direct current (DC-DC) converter includes a signal output terminal, an output stage circuit, a first comparator, a latch, a control logic circuit, a driver circuit and an on-time control circuit. The output stage circuit is connected to the signal output terminal and provides an output voltage to the signal output terminal according to an input voltage. The first comparator receives a reference voltage and a feedback signal related to the output voltage, and outputs a control voltage signal. The latch receives the control voltage signal and a timing signal, and outputs an on-enable signal. The control logic circuit receives the on-enable signal and outputs an on-control signal. The driver circuit controls charge/discharge time of the output stage circuit according to the on-control signal. The on-time control circuit receives the on-control signal and the input voltage and outputs the timing signal. The timing signal is related to a duty cycle of the output stage circuit.

A synchronous buck DC-DC conversion method includes charging and/or discharging an inductor based on an input voltage by using a first switching circuit to provide an output voltage, controlling the switching of the first switching circuit according to an on-control signal, comparing a feedback voltage signal, related to the output voltage, and a reference voltage signal to generate a control voltage signal, latch-controlling the control voltage signal and a timing signal to output an on-enable signal, logically operating the on-enable signal to output the on-control signal, and generating the timing signal, related to a duty cycle of the first switching circuit, according to the on-control signal and the input voltage.

As above, the synchronous buck DC-DC converters and methods according to the embodiments is used to enable the switching period to not change following load current, thereby improving performance of the converters and expanding the application range of the converters.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
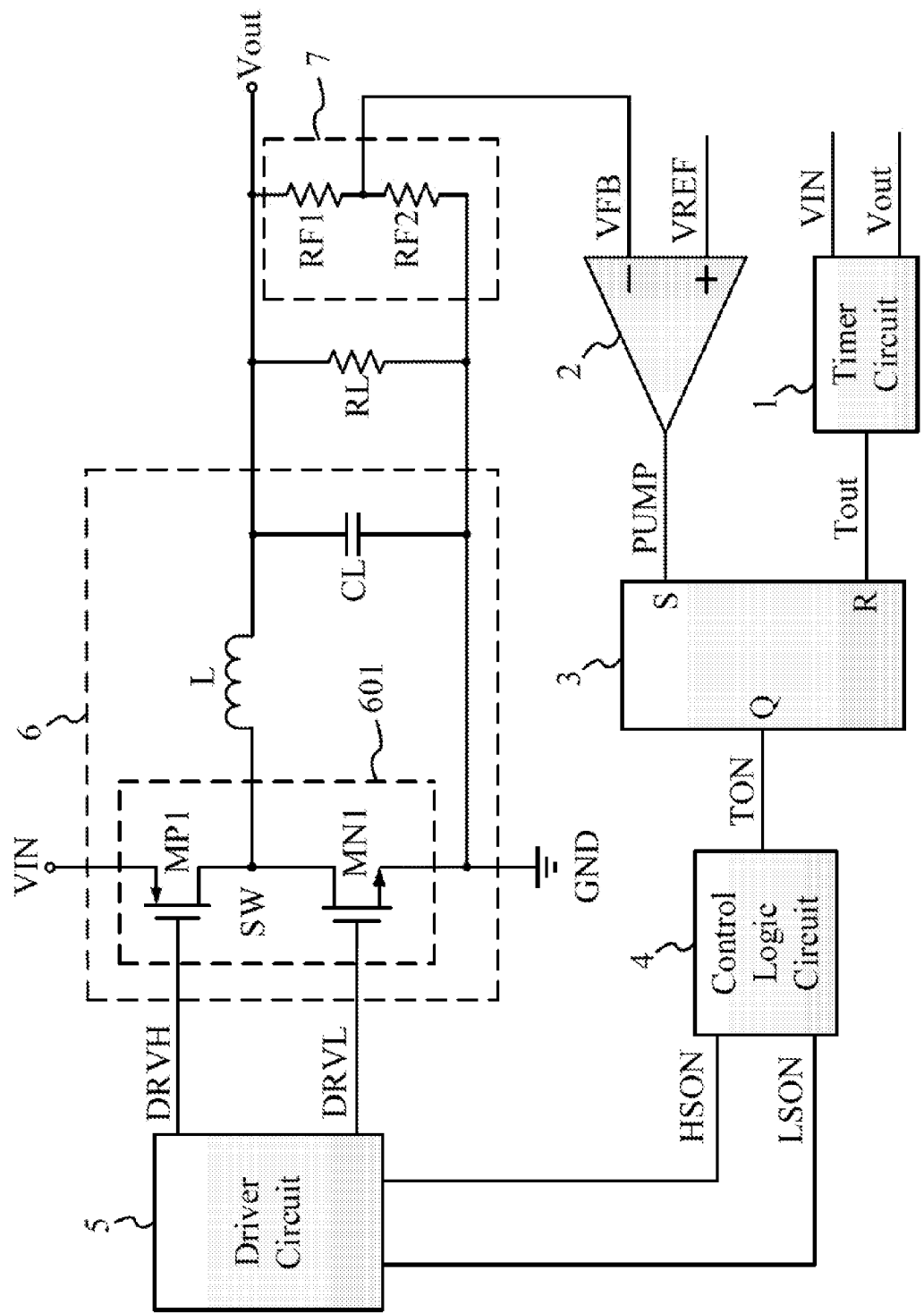
FIG. 1 is a schematic diagram of a synchronous buck direct current to direct current (DC-DC) converter with constant on-time control mode.

FIG. 1 is a schematic diagram of a synchronous buck direct current to direct current (DC-DC) converter with constant on-time control mode. A synchronous buck DC-DC converter with constant on-time control mode includes a timer circuit 1, a first comparator 2, a latch 3, a control logic circuit 4, a driver circuit 5, an output stage circuit 6 and a feedback circuit 7.

A first input terminal of the timer circuit 1 is connected to a power supply terminal, which is to provide an input voltage VIN, and a second input terminal of the timer circuit 1 is connected to a signal output terminal, which is to provide an output voltage Vout. An output terminal of the timer circuit 1 is connected to a reset terminal R of the latch 3. A positive input terminal of the first comparator 2 is connected to a reference voltage signal VREF, and a negative input terminal of the first comparator 2 is connected to a feedback terminal of the feedback circuit 7. An output terminal of the first comparator 2 is connected a set terminal S of the latch 3. An output terminal Q of the latch 3 is connected to an input terminal of the control logic circuit 4. A first output terminal of the control logic circuit 4 is connected to a first input terminal of the driver circuit 5, and a second output terminal of the control logic circuit 4 is connected to a second input terminal of the driver circuit 5. A first output terminal of the driver circuit 5 is connected to a first control terminal of the output stage circuit 6, and a second output terminal of the driver circuit 5 is connected to a second control terminal of the output stage circuit 6. An input terminal of the output stage circuit 6 is connected to the power supply terminal, and an output terminal of the output stage circuit 6 is connected to the signal output terminal. The feedback circuit 7 is connected between the signal output terminal and a ground terminal GND.

Therein, the output stage circuit 6 includes a switching circuit (referred to as a first switching circuit 601 in the discussion below) and an inductor L. An input terminal of the first switching circuit 601 (i.e. the input terminal of the output stage circuit 6) is connected to the power supply terminal, and an output terminal of the first switching circuit 601 is connected to a first terminal of the inductor L. A second terminal of the inductor L is the output terminal of the output stage circuit 6, and is connected to the signal output terminal. A first control terminal of the first switching circuit 601 (i.e. the first control terminal of the output stage circuit 6) receives a gate control signal DRVH from the driver circuit 5, and a second control terminal of the first switching circuit 601 (i.e. the second control terminal of the output stage circuit 6) receives a gate control signal DRVL from the driver circuit 5. The first switching circuit 601 controls charge/discharge time of the current (the inductor) according to the gate control signal DRVH and the gate control signal DRVL, so that the output terminal of the output stage circuit 6 can output a regulated DC output voltage Vout.

The timer circuit 1 generates a periodic timing signal Tout according to the input voltage VIN and the output voltage Vout. The first comparator 2 outputs a control voltage signal PUMP, which is a digital signal generated by comparing the feedback voltage signal VFB and the reference voltage signal VREF. The latch 3 latch-controls the control voltage signal PUMP and the timing signal Tout, based on which the on-enable signal TON is generated for the first switching circuit. In other words, the on-enable signal is generated according to the control voltage signal PUMP and a timing signal Tout via a latch.

The control logic circuit 4 receives the on-enable signal TON generated by the latch 3 and outputs an on-control signal HSON and an on-control signal LSON for the first switching circuit after being through logic operation. The first input terminal of the driver circuit 5 receives the on-control signal HSON and the second input terminal of the driver circuit 5 receives the on-control signal LSON. According to the on-control signal HSON and the on-control signal LSON, the driver circuit 5 correspondingly generates a gate control signal DRVH and a gate control signal DRVL. The first output terminal of the driver circuit 5 outputs the gate control signal DRVH and the second output terminal of the driver circuit 5 outputs the gate control signal DRVL.

In some embodiments, the output stage circuit 6 further includes a capacitor CL. The second terminal of the inductor L is further connected to a first terminal of the capacitor CL while a second terminal of the capacitor CL is connected to the ground terminal GND. Herein, the connection terminal of the inductor L and the capacitor CL is the output terminal of the output stage circuit 6, and is connected to the signal output terminal. The inductor L and the capacitor CL constitute an LC smoothing filter circuit to provide a smoothed output voltage Vout.

In some embodiments, the first switching circuit 601 includes a P-channel metal oxide semiconductor (P-MOS) transistor MP1 and an N-channel MOS (N-MOS) transistor MN1. The gate terminal of the P-MOS transistor MP1 (i.e. the first control terminal of the first switching circuit 601) is connected to the first output terminal of the driver circuit 5, and the source terminal of the P-MOS transistor MP1 (i.e. the input terminal of the first switching circuit 601) is connected to the power supply terminal. The gate terminal of the N-MOS transistor MN1 (i.e. the second control terminal of the first switching circuit 601) is connected to the second output terminal of the driver circuit 5, and the source terminal of the N-MOS transistor MN1 is connected to the ground terminal GND. The drain terminal of the P-MOS transistor MP1, the drain terminal of the N-MOS transistor MN1 and first terminal of the inductor L are all connected to a node SW, which is the output terminal of the first switching circuit 601. In other words, the P-MOS transistor MP1 is connected between the power supply terminal and the inductor L to provide a charging current path, while the N-MOS transistor MN1 is connected between the ground terminal GND and the inductor L to provide a discharging current path.

Herein, the control logic circuit 4 receives the on-enable signal TON, generated by the latch 3, and outputs the on-control signal HSON for the P-MOS transistor MP1 and the on-control signal LSON for the N-MOS transistor MN1 after being through logic operations. According to the on-control signal HSON and the on-control signal LSON, the driver circuit 5 correspondingly generates a gate control signal DRVH and a gate control signal DRVL, respectively. The gate terminal of the P-MOS transistor MP1 is controlled by the gate control signal DRVH, and the gate terminal of the N-MOS transistor MN1 is controlled by the gate control signal DRVL. The input voltage VIN is connected to the node SW via the P-MOS transistor MP1, and the N-MOS transistor MN1 is connected between the node SW and the ground terminal GND. The inductor L is connected between the node SW and the output voltage Vout.

When the P-MOS transistor MP1 is turned on, the input voltage VIN pass through the P-MOS transistor MP1 to the first terminal of the inductor L so that the input voltage VIN can charge the inductor L through the P-MOS transistor MP1. When the N-MOS transistor MN1 is turned on, the inductor L is connected to the ground terminal GND via the N-MOS transistor MN1 so that the inductor L can be discharged. Thus, charge/discharge time of the current (the inductor L) is controlled by adjusting the "on" time of the P-MOS transistor MP1 and the N-MOS transistor MN1 so that the output stage circuit 6 can output a stable DC output voltage Vout.

In some embodiments of the aforementioned synchronous buck DC-DC converter, a periodic timing signal Tout, generated by the timer circuit 1, and the control voltage signal PUMP together serve to control the switching (ON/OFF, i.e. turned on and turned off) of the switching circuit. For given input voltage VIN and output voltage Vout, the time of the on-enable signal TON is constant (i.e. the on-time is constant). Due to the non-negligible effect of on-resistances of the P-MOS transistor MP1 and the N-MOS transistor MN1, at various load currents, the duty cycle of the switching circuit (i.e. the switching circuit 601) must vary accordingly to maintain a constant output voltage Vout. Thus, the switching period Tsw of the switching circuit (i.e. the switching circuit 601) will vary with the load current at the signal output terminal. Generally, the larger the load current, the higher the required duty cycle is. However, since the on-time is constant, the switching period Tsw will be reduced and thereby the switching frequency is increased.

In other words, in the aforementioned synchronous buck DC-DC converter, since the input voltage VIN and the output voltage Vout are fixed, when the loading or the required load current changes (i.e. the load current changes), the feedback loop will adjust the duty cycle D to provide a new duty cycle D' in response to the load current change.

However, with timing period Ton (i.e. the on-time) of the timing signal Tout being fixed and the duty cycle being changed to D', the switching period Tsw of the switching signal must change accordingly to accommodate such change, thereby to achieve a new steady state (Tsw=Ton/D'). The switching period Tsw of the switching signal varies with load current at the signal output terminal, and henceforth, the turn-on frequency (switching frequency) of the P-MOS transistor MP1 and the N-MOS transistor MN1 will vary correspondingly.

In some embodiments, the feedback circuit 7 can be implemented by a voltage divider circuit, which divides the output voltage to generate the feedback voltage signal VFB. Herein, the feedback circuit 7 includes a first feedback resistor RF1 and a second feedback resistor RF2. One terminal of the first feedback resistor RF1 is connected to one terminal of the second feedback resistor RF2. The other terminal of the first feedback resistor RF1 is connected to the output terminal of the output stage circuit 6 and the signal output terminal, while the other terminal of the second feedback resistor RF2 is connected to the ground terminal GND. The connection terminal (the voltage-dividing node) of the first feedback resistor RF1 and the second feedback resistor RF2 is the feedback terminal of the feedback circuit 7, and is connected to the negative input terminal of the first comparator 2.

In some embodiments, the feedback circuit 7 can also be implemented by a feedback trace (not shown in the drawings). One end of the feedback trace is connected to the output terminal of the output stage circuit 6 and the signal output terminal. The other end of the feedback trace is the feedback terminal of the feedback circuit 7, and is connected to the negative input terminal of the first comparator 2.

Figure 2:
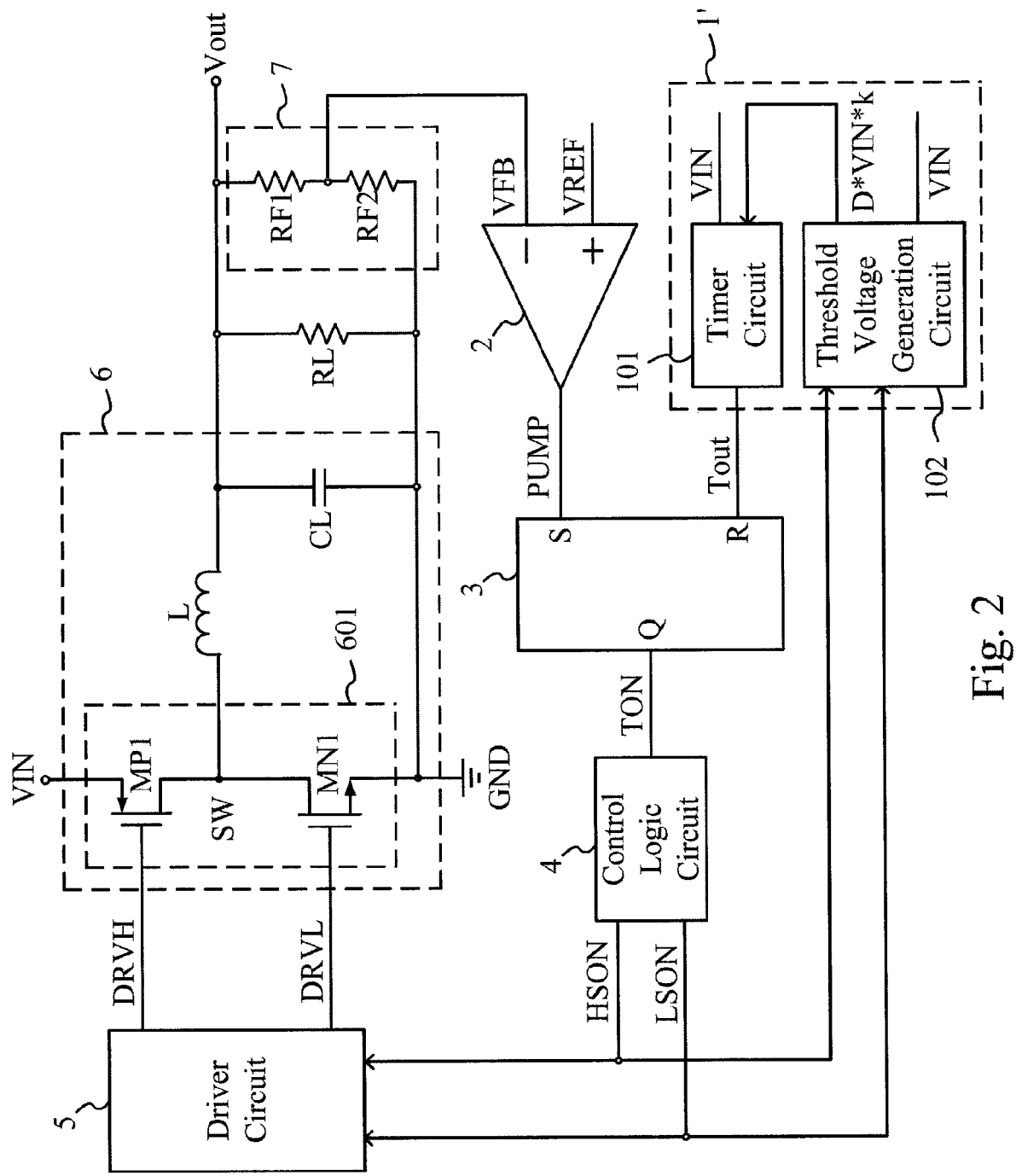
FIG. 2 is a schematic diagram of a synchronous buck DC-DC converter according to one embodiment of the instant disclosure.

FIG. 2 is a schematic diagram of a synchronous buck DC-DC converter according to one embodiment of the instant disclosure. Referring to FIG. 2, this synchronous buck DC-DC converter can provide a constant switching period Tsw. In this embodiment, the synchronous buck DC-DC converter includes: an on-time control circuit 1', a first comparator 2, a latch 3, a control logic circuit 4, a driver circuit 5, a output stage circuit 6 and a feedback circuit 7. Herein, the structures and the operations of the first comparator 2, the latch 3, the control logic circuit 4, the driver circuit 5, the output stage circuit 6 and feedback circuit 7 are substantially the same as the aforementioned embodiments.

Therein, the first output terminal of the control logic circuit 4 is also connected to a first input terminal of the on-time control circuit 1' and the second output terminal of the control logic circuit 4 is also connected to a second input terminal of the on-time control circuit 1'. The on-time control circuit 1' receives the on-control signals, HSON and LSON, and generates a timing signal Tout according to the on-control signals, HSON and LSON, and the input voltage VIN. Herein, the time delay of the timing signal Tout will change correspondingly with the load current change at the signal output terminal.

In some embodiments, the on-time control circuit 1' includes a timer circuit 101 and a threshold voltage generation circuit 102. A first input terminal of the threshold voltage generation circuit 102 is connected to the first output terminal of the control logic circuit 4, and a second input terminal of the threshold voltage generation circuit 102 is connected to the second output terminal of the control logic circuit 4. The output terminal of the threshold voltage generation circuit 102 is connected to a second input terminal of the timer circuit 101. A first input terminal of the timer circuit 101 is connected to the input voltage VIN, and an output terminal of the timer circuit 101 is connected to the RESET terminal R of the latch 3.

The second input terminal of the timer circuit 101 receives a threshold voltage signal D*VIN*k (i.e. the threshold voltage signal D*VIN*k is k times the product of the duty cycle D and the input voltage VIN), generated by the threshold voltage generation circuit 102. Herein, the threshold voltage generation circuit 102 receives the on-control signals, HSON and LSON, and based on the on-control signals, HSON and LSON, generates the threshold voltage signal D*VIN*k, which is proportional to the duty cycle D of the switching signals (i.e. the gate control signals, DRVH and DRVL) for the first switch circuit 601. According to the input voltage VIN and the threshold voltage signal D*VIN*k, the timer circuit 101 outputs the periodic timing signal Tout, and the timing period of the timing signal Tout will also be proportional to the duty cycle D. In other words, when the load current changes at the signal output terminal and the duty cycle D changes accordingly, the threshold voltage signal D*VIN*k will also therefore change, and thereby the timing period Ton of the timing signal Tout is also proportional to the duty cycle D.

The timing period Ton of the timing signal Tout can be obtained by simple calculation: VIN/R*Ton=C*D*VIN*k, i.e. Ton=C*R*D*k, wherein R is resistance of a charging circuit in the timer circuit 101 and C is capacitance of the capacitor C11. Herein, assuming a scaling factor K, the relationship between the timing period Ton and the duty cycle D can be expressed as Ton=K*D. Since the relationship between the switching period Tsw and the timing period Ton is Tsw=Ton/D, it can be known that the switching period Tsw is a constant, equal to K. In other words, the switching period Tsw of a synchronous buck DC-DC converter is independent of the duty cycle D; that is, it will not vary with the load current change, thereby achieving to have a constant switching period Tsw. A synchronous buck DC-DC converter with a constant switching period Tsw, based on the topology of a constant on-time control mode synchronous buck DC-DC converter, further includes a threshold voltage generation circuit 102, which generates a threshold voltage signal D*VIN*k, proportional to the duty cycle D, so that switching period Tsw can be constant even when the load current changes.

Herein, the load current change refers to the variation within the load range of a DC-DC converter. Further, under the condition of a constant voltage (output voltage Vout) output, if the load resistor RL is smaller, the load current (Vout/RL) will be larger; on the contrary, if the load resistor RL is larger, the load current (Vout/RL) will be smaller. Also, the load current change described herein is within a certain range.

Herein, k is a fixed value and can be customized, based on actual needs.

Figure 3:
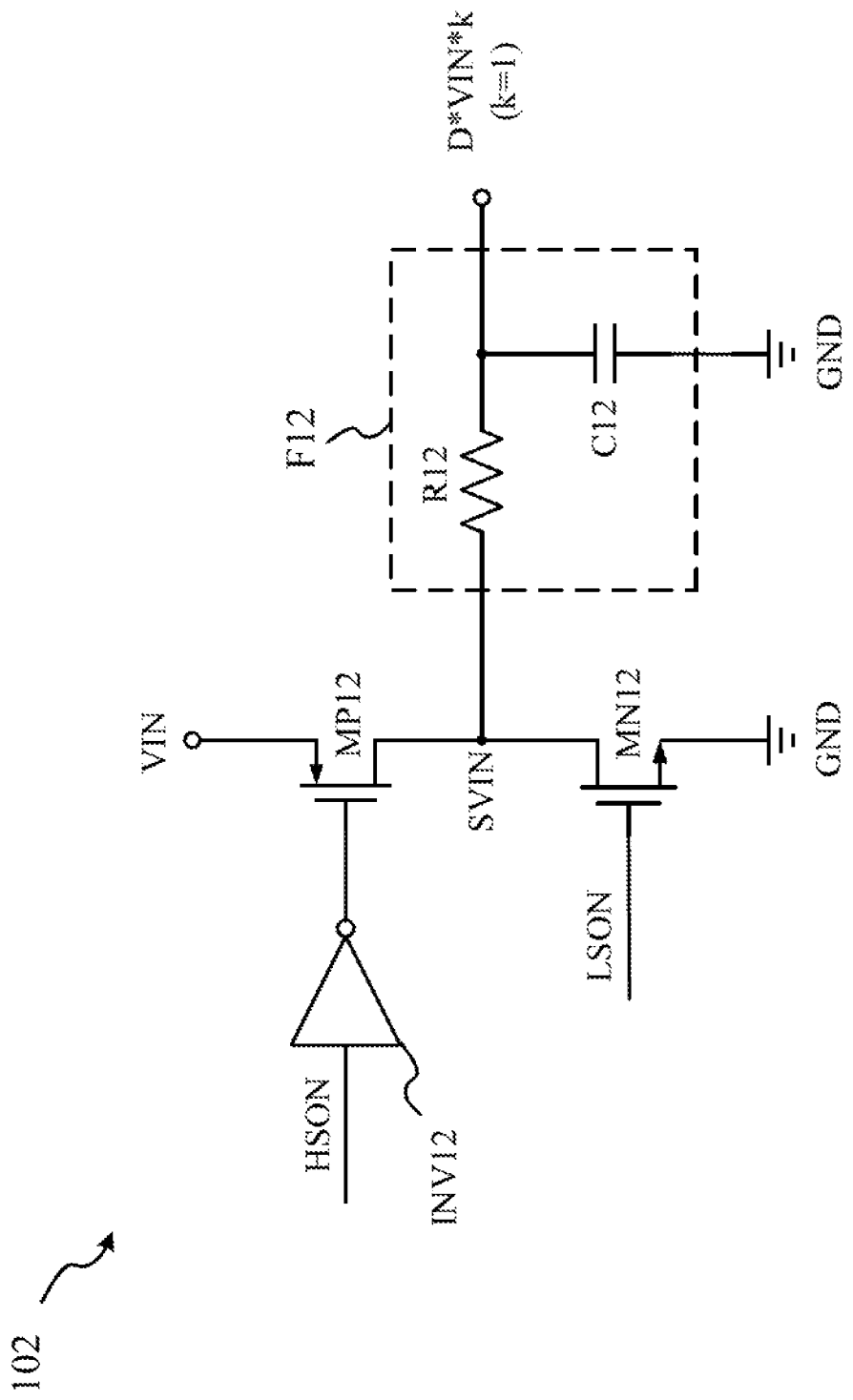
FIG. 3 is a schematic diagram of one embodiment of the threshold voltage generation circuit in FIG. 2.

FIG. 3 is a schematic diagram of one embodiment of the threshold voltage generation circuit in FIG. 2. In some embodiments, with reference to FIG. 3, the threshold voltage generation circuit 102 includes a switching circuit (hereinafter referred to as a second switching circuit), a low-pass filter F12 and an inverter INV12, wherein the second switching circuit includes a P-MOS transistor MP12 and an N-MOS transistor MN12.

The input terminal of the inverter INV12 is connected to the first output terminal of the control logic circuit 4. The gate terminal of the P-MOS transistor MP12 is connected to the output terminal of the inverter INV12, and the source terminal of the P-MOS transistor MP12 is connected the power supply terminal. The drain terminal of the P-MOS transistor MP12 is connected to the drain terminal of the N-MOS transistor MN12 and is also connected to an input terminal of the low-pass filter F12. The gate terminal of the N-MOS transistor MN12 is connected to the second output terminal of the control logic circuit 4, and the source terminal of the N-MOS transistor MN12 is connected to the ground terminal GND. The drain terminal of the P-MOS transistor MP12, the drain terminal of the N-MOS transistor MN12 and the input terminal of the low-pass filter F12 are all connected to a node SVIN. An output terminal of the low-pass filter F12 is connected to the second input terminal of the timer circuit 101.

The input terminal of the inverter INV12 receives the on-control signal HSON for the P-MOS transistor MP1. The gate terminal of the N-MOS transistor MN12 receives the on-control signal LSON for the N-MOS transistor MN1. In other words, in the threshold voltage generation circuit 102, the gate terminal of the P-MOS transistor MP12 receives the inverted signal of the on-control signal HSON for the P-MOS transistor MP1, and the gate terminal of the N-MOS transistor MN12 receives the on-control signal LSON for the N-MOS transistor MN1. In this way, the P-MOS transistor MP12 and the N-MOS transistor MN12 can be turned on/off periodically.

For example, when the on-control signal HSON is "H" and the on-control signal LSON is "L", the P-MOS transistor MP12 will be turned on and the N-MOS transistor MN12 will be turned off so that the input voltage VIN will be connected to the output terminal of the threshold voltage generation circuit 102 via the low-pass filter F12 (i.e. the second input terminal of the timer circuit 101). On the contrary, when the on-control signal HSON is "L" and the on-control signal LSON is "H", the P-MOS transistor MP12 will be turned off and the N-MOS transistor MN12 will be turned on so that the input terminal of the low-pass filter F12 will be connected to the ground terminal GND. During each switching period Tsw, the "on" time of the P-MOS transistor MP12 is Ton, while the "on" time of the N-MOS transistor MN12 is Toff. Suppose D is duty cycle, then D=Ton/Tsw. In other words, the P-MOS transistor MP12 and the N-MOS transistor MN12 sample the input voltage VIN with duty cycle D and provide the sampled input voltage to the low-pass filter F12 via the node SVIN. The low-pass filter F12 transmits the DC component of the sampled input voltage VIN without attenuation to the output terminal of the threshold voltage generation circuit 102 so that a DC threshold voltage signal D*VIN*k is obtained at the output terminal of the threshold voltage generation circuit 102. In this embodiment, k=1, i.e., the threshold voltage signal D*VIN*k is the product of duty cycle D and the input voltage VIN.

In some embodiments, the low-pass filter F12 includes a resistor R12 and a capacitor C12. A first terminal of the resistor R12 is connected to the drain terminal of the P-MOS transistor MP12, and is also connected to the drain terminal of the N-MOS transistor MN12. That is, the first terminal of the resistor R12 is connected to the node SVIN. A second terminal of the resistor R12 is connected to a first terminal of a capacitor C12, and is also connected to the second input terminal of the timer circuit 101. The second terminal of the capacitor C12 is connected to the ground terminal GND.

Figure 4:
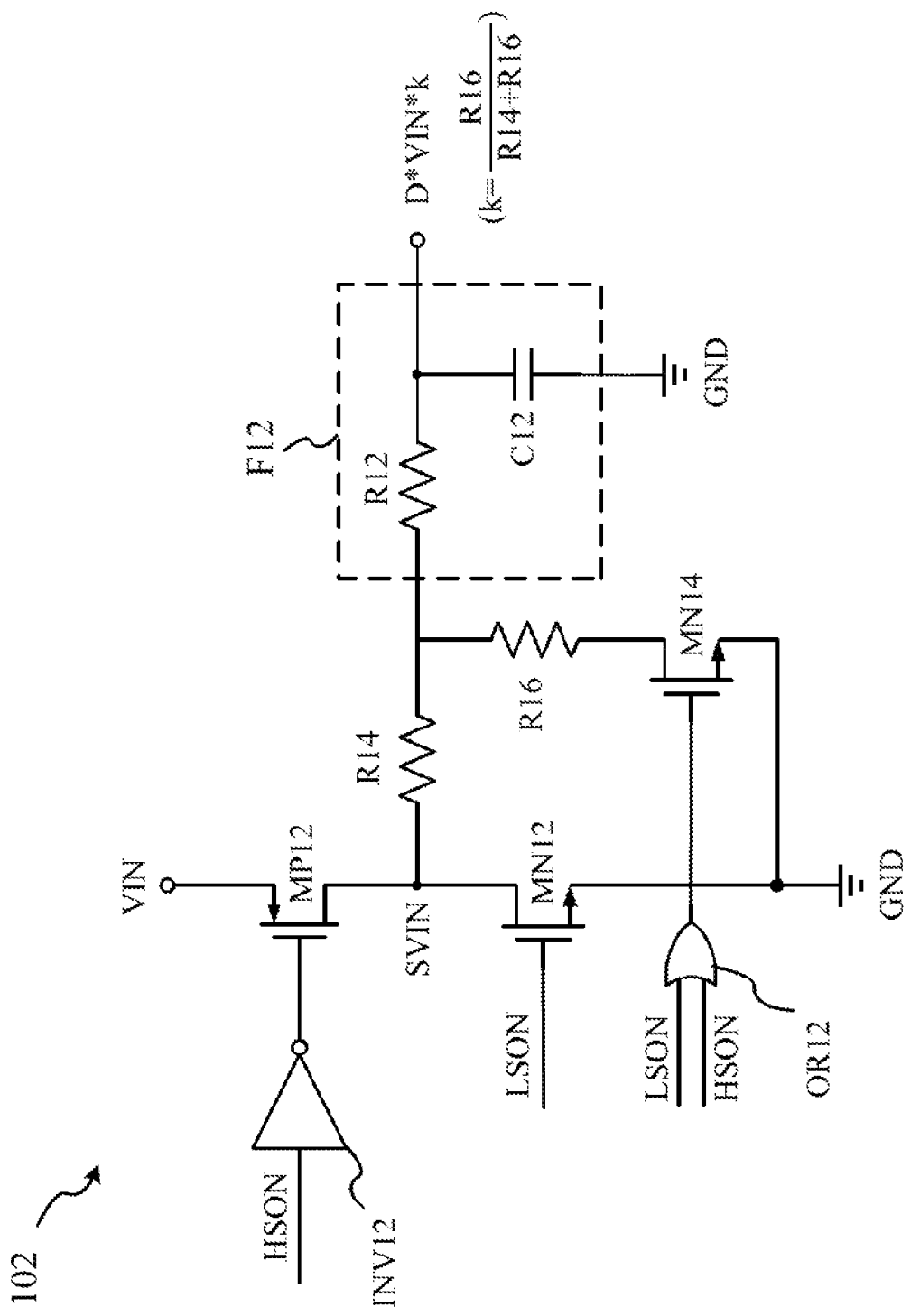
FIG. 4 is a schematic diagram of another embodiment of the threshold voltage generation circuit in FIG. 2.

FIG. 4 is a schematic diagram of another embodiment of the threshold voltage generation circuit in FIG. 2. In other embodiments, with reference to FIG. 4, the threshold voltage generation circuit 102 includes a switching circuit (hereinafter referred to as a second switching circuit), a scaling circuit, a low-pass filter F12 and a inverter INV12, wherein the second switching circuit includes a P-MOS transistor MP12 and an N-MOS transistor MN12 and the scaling circuit includes two resistors, R14 and R16, an N-MOS transistor MN14 and an OR gate OR12.

The input terminal of the inverter INV12 is connected to the first output terminal of the control logic circuit 4. The gate terminal of the P-MOS transistor MP12 is connected to the output terminal of the inverter INV12, and the source terminal of the P-MOS transistor MP12 is connected to the power supply terminal. The drain terminal of the P-MOS transistor MP12 is connected to the drain terminal of the N-MOS transistor MN12, and is also connected to the input terminal of the low-pass filter F12. The gate terminal of the N-MOS transistor MN12 is connected to the second output terminal of the control logic circuit 4, and the source terminal of the N-MOS transistor MN12 is connected to the ground terminal GND. The drain terminal of the P-MOS transistor MP12, the drain terminal of the N-MOS transistor MN12 and a first terminal of the resistor R14 are all connected to a node SVIN. A second terminal of the resistor R14 is connected to a first terminal of the resistor R16 and the input terminal of the low-pass filter F12. The output terminal of the low-pass filter F12 is connected to the second input terminal of the timer circuit 101. A second terminal of the resistor R16 is connected to the drain terminal of the N-MOS transistor MN14. The source terminal of the N-MOS transistor MN14 is connected to the ground terminal GND. Two terminals of the OR gate OR12 are connected to the first output terminal and the second output terminal of the control logic circuit 4, respectively. The output terminal of the OR gate OR12 is connected the gate terminal of the N-MOS transistor MN14.

The input terminal of the inverter INV12 receives the on-control signal HSON for the P-MOS transistor MP1. The gate terminal of the N-MOS transistor MN12 receives the on-control signal LSON for the N-MOS transistor MN1. In other words, in the threshold voltage generation circuit 102, the gate terminal of the P-MOS transistor MP12 receives the inverted signal of the on-control signal HSON for the P-MOS transistor MP1, and the gate terminal of the N-MOS transistor MN12 receives the on-control signal LSON for the N-MOS transistor MN1. In this way, the P-MOS transistor MP12 and the N-MOS transistor MN12 can be turned on/off periodically, thereby to sample the input voltage VIN.

During each switching period Tsw, the "on" time of the P-MOS transistor MP12 is Ton, while the "on" time of the N-MOS transistor MN12 is Toff. Suppose D is duty cycle, then D=Ton/Tsw. In other words, the P-MOS transistor MP12 and the N-MOS transistor MN12 sample the input voltage VIN with duty cycle D and provide the sampled input voltage via the node SVIN. The scaling circuit scales the sampled input voltage by a scaling factor k. The low-pass filter F12, consisting of the resistor R12 and the capacitor C12, transmits the DC component of the scaled input voltage VIN*k without attenuation to the output terminal of the threshold voltage generation circuit 102 so that a DC threshold voltage signal D*VIN*k is obtained at the output terminal of the threshold voltage generation circuit 102. In this embodiment, k=R14/(R14+R16).

Figure 5:
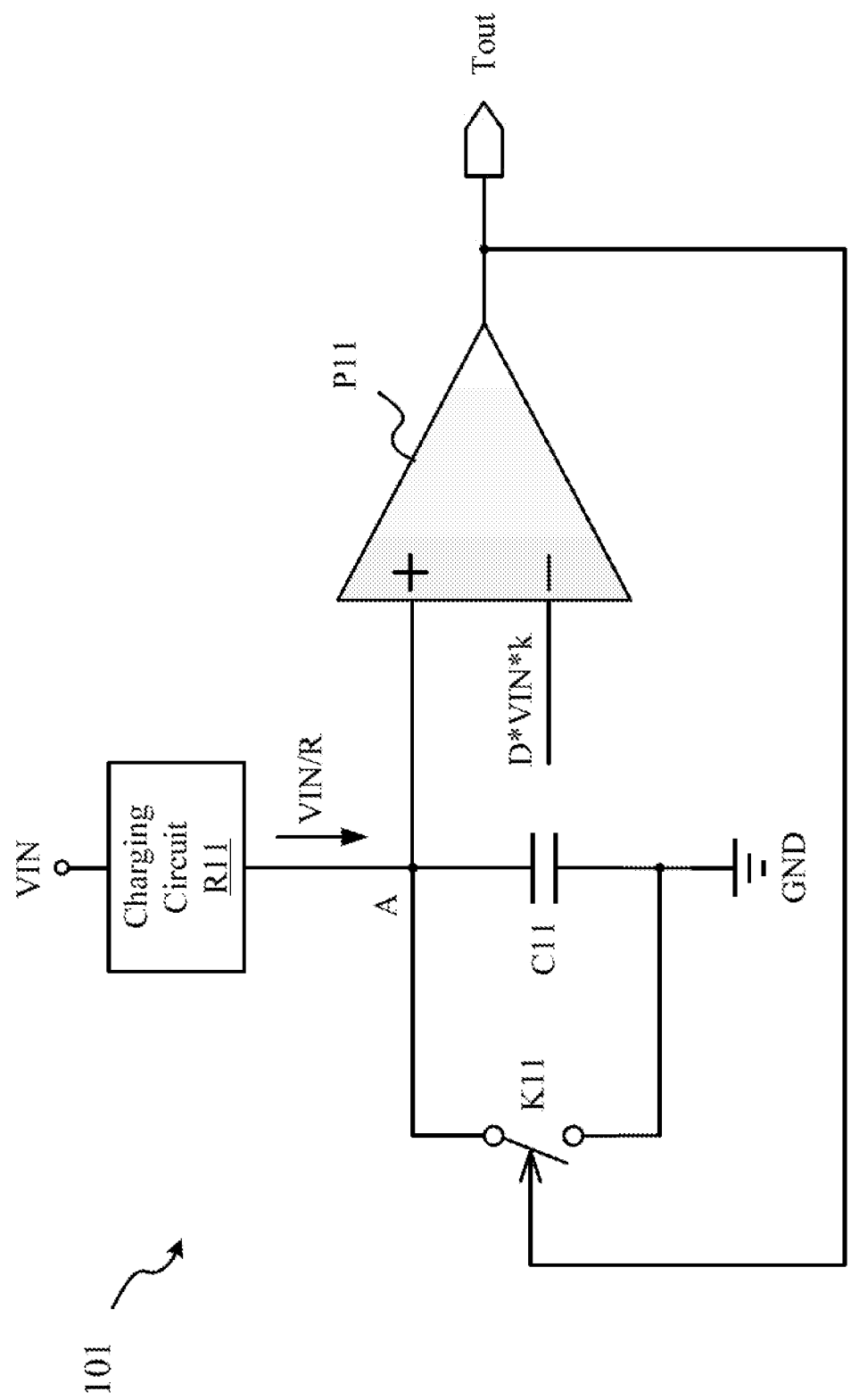
FIG. 5 is a schematic diagram of one embodiment of the timer circuit in FIG. 2.

FIG. 5 is a schematic diagram of one embodiment of the timer circuit 101 in FIG. 2. In some embodiments, with reference to FIG. 5, the timer circuit 101 includes a second comparator P11, a charging circuit R11, a capacitor C11 and a switching device K11.

A negative input terminal of the second comparator P11 is connected to the threshold voltage generation circuit 102 (i.e. the output terminal of the low-pass filter F12). An output terminal of the second comparator P11 is connected to the RESET terminal R of the latch 3 and is also connected to a control terminal of the switching device K11. A positive input terminal of the second comparator P11, a first terminal of the capacitor C11, a first terminal of the switching device K11 and an output terminal of the charging circuit R11 are all connected to a node A. An input terminal of the charging circuit R11 is connected to the power supply terminal. A second terminal of the capacitor C11 and a second terminal of the switching device K11 are both connected to the ground terminal GND. In other words, the switching device K11 is connected in parallel with the capacitor C11.

In the timer circuit 101, the charging circuit R11 receives the input voltage VIN and converts the input voltage VIN into a charging current signal VIN/R, and then charges the capacitor C11 with the charging current signal VIN/R. The second comparator P11 compares the terminal voltage (VA) of the capacitor C11 (the voltage at the node A) with the threshold voltage signal D*VIN*k to generate a timing signal Tout. This timing signal Tout is used as a feedback signal to control the switching of the switching device K11, thereby to generate the periodic timing signal Tout. Herein, the timing period Ton of this timing signal Tout can be expressed as Eq. 1 below.

$$Ton = \frac{D*VIN*k*C}{VIN/R} = D*k*R*C \quad \text{Eq. 1}$$

Further, in an initial state, terminal voltage VA of the capacitor C11 is zero, the timing signal Tout is "L" to turn off the switching device K11, so the charging current signal VIN/R starts to charge the capacitor C11, which causes terminal voltage VA to gradually increase. When terminal voltage VA of the capacitor C11 reaches the threshold voltage signal D*VIN*k, the timing signal Tout, output from the second comparator P11, will be set "H". This "H" level closes the switching device K11, which discharges the capacitor C11 and thereby causes terminal voltage VA to drop to zero. Once terminal voltage VA drops to zero, the timing signal Tout, output from the second comparator P11, will be set "L" again and the charging current signal VIN/R will charge the capacitor C11 again. Wish such loop, the second comparator P11 can generate a periodic timing signal Tout with timing period Ton=D*R*C, wherein R is resistance of the charging circuit R11, and C is capacitance of the capacitor C11.

When a synchronous buck DC-DC converter operates in a normal condition, load current is allowed to vary within a certain range. Ideally, if on-resistance of an MOS transistor (a switching circuit) being neglected, the duty cycle D can be expressed as Eq. 2 shown below.

$$D = Vout/VIN \quad \text{Eq. 2}$$

Eq. 3 can be obtained by Eq. 1 and Eq. 2, as below.

$$Ton = \frac{Vout*k*C}{VIN/R} = D*k*R*C \quad \text{Eq. 3}$$

Besides, the switching period Tsw can be derived by Eq. 3, as shown in Eq. 4 below.

$$Tsw = \frac{Ton}{D} = \frac{D*k*R*C}{D} = k*R*C \quad \text{Eq. 4}$$

It can be seen from Eq. 4 that the switching period Tsw is a constant value, i.e. k*R*C.

However, in practice, since on-resistance of an MOS transistor (a switching circuit) is not negligible, the duty cycle D indeed will vary with load current. Suppose on-resistance of the P-MOS transistor MP1 is Rhs, on-resistance of the N-MOS transistor MN1 is Rls and the load current is Io, the actual duty cycle D is shown as Eq. 5 below.

$$D = \frac{Vout + Io*Rls}{VIN - Io*(Rhs - Rls)} \neq \frac{Vout}{VIN} \quad \text{Eq. 5}$$

In a constant on-time control-mode synchronous buck DC-DC converter, the timing period Ton of the timing signal Tout, output from the timer circuit 1, can be described as Eq. 6 below.

$$Ton = \frac{Vout}{VIN}*R*C \quad \text{Eq. 6}$$

Substitute actual duty cycle D as in Eq. 5 and timing period Ton as in Eq. 6 into the equation for the switching period Tsw, Eq. 7 can be obtained as below.

$$Tsw = \frac{Ton}{D} = RC \cdot \frac{Vout}{Vout + Io*Rls} \cdot \frac{VIN - Io*(Rhs - Rls)}{VIN} < RC \quad \text{Eq. 7}$$

From Eq. 7 above, the switching period Tsw actually varies with load current Io.

To solve the problem of instability of the switching period Tsw, in the on-time control circuit 1', the threshold voltage signal D*VIN*k is used to replace the output voltage Vout in the prior art to obtain the timing period Ton as Eq. 8 shown below.

$$Ton = \frac{D*VIN*k*C}{VIN/R} = D*k*R*C \quad \text{Eq. 8}$$

By the equation of the switching period Tsw, Eq. 9 can be obtained as below.

$$Tsw = \frac{Ton}{D} = \frac{D*k*R*C}{D} = k*R*C \quad \text{Eq. 9}$$

From Eq. 9 above, it can be known that the switching period Tsw is constant (k*R*C).

For example, timing period Ton varies with duty cycle D, i.e., Ton=D*t, where time t is predetermined and is fixed. Herein, the switching period Tsw=Ton/D=t. When the loading or the required load current changes (i.e. the load current changes), the feedback loop will adjust the duty cycle D to provide a new duty cycle D' in response to the load current change. Since the duty cycle D is changed to D' and the timing period Ton is also changed to the new timing period Ton'=D'*t, the switching period can be expressed as the following equation: Tsw=Ton'/D'=t. Therefore, switching period Tsw is kept constant regardless of the duty cycle variation. That is, no matter how the loading or the required load current changes, switching period Tsw can be kept constant.

Figure 6:
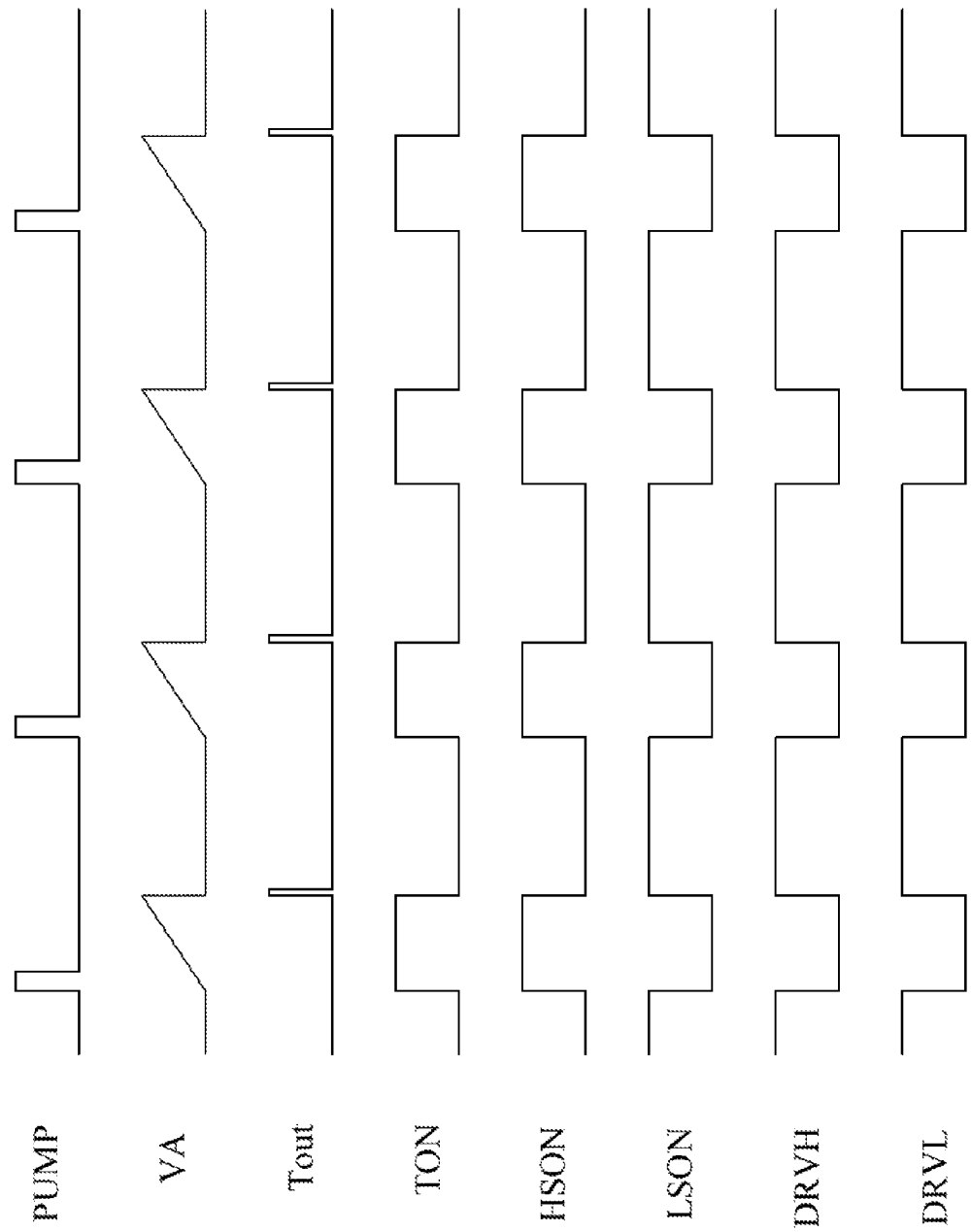
FIG. 6 is a timing diagram of the related signals in FIG. 2, FIG. 3 and FIG. 5.

FIG. 6 is a timing diagram of the related signals in FIG. 2, FIG. 3 and FIG. 5. The timing relationships among all the control voltage signal PUMP, terminal voltage VA, the timing signal Tout, the on-enable signal TON, the on-control signals, HSON and LSON, and the gate control signal, DRVH and DRVL are shown in FIG. 6.

As above, the synchronous buck DC-DC converters and methods according to the embodiments is used to enable the switching period to not change following load current, thereby improving performance of the converters and expanding the application range of the converters.

While the instant disclosure has been described by the aforementioned embodiments, it is to be understood that the invention needs not be limited to the disclosed embodiments. For anyone skilled in the art, various modifications and variations within the spirit of the instant disclosure are covered under the scope of the instant disclosure. The covered scope of the instant disclosure is based on the appended claims.

What is claimed is:

1. A synchronous buck direct current to direct current (DC-DC) converter, comprising:
   a signal output terminal, for outputting an output voltage;
   an output stage circuit, connected to the signal output terminal, for providing the output voltage according to an input voltage;
   a first comparator, for receiving a feedback signal and a reference voltage signal and outputting a control voltage signal, wherein the feedback signal is related to the output voltage;
   a latch, for receiving the control voltage signal and a timing signal and outputting an on-enable signal;
   a control logic circuit, for receiving the on-enable signal and outputting an on-control signal;
   a driver circuit, for controlling charge/discharge time of the output stage circuit according to the on-control signal; and
   an on-time control circuit, for receiving the on-control signal and the input voltage and outputting the timing signal, wherein the timing signal is related to a duty cycle of the output stage circuit, and the on-time control circuit comprises:
      a threshold voltage generation circuit, for receiving the on-control signal and the input voltage, sampling the input voltage with the on-control signal, and outputting a threshold voltage signal based on the sampled input voltage, wherein the threshold voltage generation circuit comprises:
         an inverter receiving the on-control signal;
         a switching circuit comprising a P-MOS transistor and a first N-MOS transistor, wherein a gate terminal of the P-MOS transistor is coupled directly to an output of the inverter;
         a scaling circuit for providing a scaling factor, the scaling circuit comprising a first resistor, a second resistor, a second N-MOS transistor, and an OR gate receiving the on-control signal, the switching circuit being connected to the input voltage via the P-MOS transistor of the switching circuit; and
         a low-pass filter, coupled directly to the first resistor and to the second resistor of the scaling circuit, the low-pass filter receiving the input voltage with the scaling factor from the scaling circuit and outputting the threshold voltage signal; and
      a timer circuit, for receiving the threshold voltage signal and the input voltage and outputting the timing signal.

2. The synchronous buck DC-DC converter according to claim 1, wherein the timing period of the timing signal is proportional to the duty cycle and the input voltage.

3. The synchronous buck DC-DC converter according to claim 1, wherein the timer circuit comprising: a resistor, for receiving the input voltage and providing a charging current signal according to the input voltage; a capacitor, connected between the resistor and a ground terminal, for receiving the charging current signal; a switching device, connected in parallel with the capacitor; and a second comparator, for receiving a terminal voltage of the first terminal of the capacitor and the threshold voltage signal and outputting the timing signal.

4. The synchronous buck DC-DC converter according to claim 1, wherein the threshold voltage signal is proportional to the duty cycle and the input voltage.

5. The synchronous buck DC-DC converter according to claim 1, wherein the output stage circuit comprising:
   an inductor; and
   a switching circuit, controlled by the driver circuit, for providing a charging path between the input voltage and a first terminal of the inductor and a discharging path between the first terminal of the inductor and the ground terminal, wherein a second terminal of the inductor is connected to the signal output terminal.

6. The synchronous buck DC-DC converter according to claim 5, wherein the output stage circuit further comprising: a capacitor, connected between the signal output terminal and the ground terminal.

7. The synchronous buck DC-DC converter according to claim 1, further comprising: a feedback circuit, connected between the signal output terminal and the first comparator.

* * * * *